(12) United States Patent
Kawaguchi

(10) Patent No.: US 9,866,102 B2
(45) Date of Patent: Jan. 9, 2018

(54) POWER CONVERSION DEVICE

(71) Applicant: Nissan Motor Co., Ltd., Yokohama-shi, Kanagawa (JP)

(72) Inventor: Shinji Kawaguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/527,040

(22) PCT Filed: Dec. 3, 2014

(86) PCT No.: PCT/JP2014/081935
§ 371 (c)(1),
(2) Date: May 16, 2017

(87) PCT Pub. No.: WO2016/088211
PCT Pub. Date: Jun. 9, 2016

(65) Prior Publication Data
US 2017/0353096 A1    Dec. 7, 2017

(51) Int. Cl.
*H02M 1/08* (2006.01)
*H02M 7/537* (2006.01)
(Continued)

(52) U.S. Cl.
CPC ............. *H02M 1/08* (2013.01); *H02M 7/003* (2013.01); *H02M 7/537* (2013.01); *H02M 2001/0054* (2013.01); *H02P 27/06* (2013.01)

(58) Field of Classification Search
CPC ........ H02M 1/08; H02M 7/537; H02M 7/003; H02M 2001/0054; H02P 27/06
(Continued)

(56) References Cited

U.S. PATENT DOCUMENTS

2009/0174353 A1* 7/2009 Nakamura .......... B60L 11/1868
                                                        318/400.27
2012/0063187 A1* 3/2012 Sato .................... H02M 3/3374
                                                        363/131
(Continued)

FOREIGN PATENT DOCUMENTS

JP    2006-81232 A    3/2006
JP    2008-118815 A   5/2008
(Continued)

OTHER PUBLICATIONS

Received STIC search report from EIC 2800 searcher Benjamin Martin dated Oct. 20, 2017.*

*Primary Examiner* — Timothy J Dole
*Assistant Examiner* — Htet Z Kyaw
(74) *Attorney, Agent, or Firm* — Global IP Counselors, LLP

(57) ABSTRACT

A power conversion device is mounted with a control circuit, a plurality of drive circuits for driving switching elements in response to control signals from the control circuit, and a plurality of power supply circuits for supplying power to the drive circuits on a substrate. The power conversion device has a drive-circuit/power supply-circuit placement and wiring regions of a high current system in which the drive circuits and the power supply circuits are disposed on the substrate are provided for the respective switching elements with isolating regions interposed between the drive-circuit/power supply-circuit placement and wiring regions and the control circuit of a low current system. A gap is formed between the pairs of the drive-circuit/power supply-circuit regions. Power supply transformers are provided for transforming a voltage supplied from the control circuit for the respective power supply circuits in-between the isolating regions.

2 Claims, 10 Drawing Sheets

(51) Int. Cl.
  *H02M 7/00* (2006.01)
  *H02P 27/06* (2006.01)
  *H02M 1/00* (2006.01)

(58) Field of Classification Search
  USPC ........ 363/131, 135, 142, 144, 145, 147, 153
  See application file for complete search history.

(56) References Cited

U.S. PATENT DOCUMENTS

| | | | |
|---|---|---|---|
| 2013/0039097 A1* | 2/2013 | Watanabe | H02M 1/44 363/21.01 |
| 2014/0092653 A1* | 4/2014 | Suzuki | H02M 1/08 363/55 |

FOREIGN PATENT DOCUMENTS

| JP | 2009-130967 A | 6/2009 |
|---|---|---|
| JP | 2012-65431 A | 3/2012 |
| JP | 2014-192975 A | 10/2014 |

\* cited by examiner

ND DEVICE

CROSS-REFERENCE TO RELATED APPLICATIONS

This application is a U.S. National stage application of International Application No. PCT/JP2014/081935, filed Dec. 3, 2014.

BACKGROUND

Field of the Invention

The present invention relates to a power conversion device.

Background Information

Conventionally, a power conversion device that aims to reduce the size and inductance is known. for example, as disclosed in Japanese Laid-Open Patent Application No. 2008-118815 (Patent Document 1). This prior art is structured such that a power supply transformer is disposed on a substrate between a semiconductor module as a drive circuit that drives switching elements of an upper arm and a semiconductor module as a drive circuit of a lower arm. Therefore, it becomes possible to shorten the transmission distance of control power between the power supply transformer and the semiconductor modules. It thereby becomes possible to reduce variation in the control power supply voltage that is supplied to each semiconductor module, and to reduce the switching surge voltage that is induced in the wiring inductance.

SUMMARY

However, the prior art described above is structured such that a power supply transformer that carries out the supply of power to both arms is disposed between the semiconductor module of the upper arm (drive circuit) and the semiconductor module of the lower arm (drive circuit). Consequently, the interval between the drive circuits on the substrate could only be separated by a distance equivalent to the dimension of the power supply transformer, which led to an increase in switching noise that is induced when switching the semiconductor module.

In view of the problems described above, an object of the present invention is to provide a power conversion device that is capable of reducing the effect of switching noise that is generated when drive circuits drive switching elements.

In order to achieve the object described above, the present invention is a power conversion device, in which a control circuit that outputs control signals to cause each switching element of a switching means to carry out a switching operation to switch between an energized state and a cutoff state, a drive circuit that is provided electrically isolated from his control circuit and drives the switching elements when receiving the control signals from the control circuit, and a power supply circuit that is provided isolated from the control circuit and supplies power to the drive circuit, are mounted on a substrate, wherein drive-circuit/power supply-circuit regions of a high current system, in which the drive circuits and the power supply circuits are disposed on the substrate, are provided for the respective switching elements with isolating regions interposed between the control circuit of a low current system, and after a predetermined gap is formed between pairs of drive-circuit/power supply-circuit regions respectively connected to the pair of switching elements, power supply transformers for transforming a voltage supplied from the control circuit to a driving voltage are provided across the isolating regions for the respective power supply circuits.

In the power conversion device of the present invention, a power supply transformer is provided for each of the power supply circuits, and a predetermined gap is formed between drive circuits without being constrained by the power supply transformer. Accordingly, compared to when the gap between drive circuits is constrained by the power supply transformer, it is possible to spread the gap between drive circuits to thereby suppress switching noise that is induced when driving the switching elements.

DETAILED DESCRIPTION OF THE EMBODIMENTS

Figure 1:
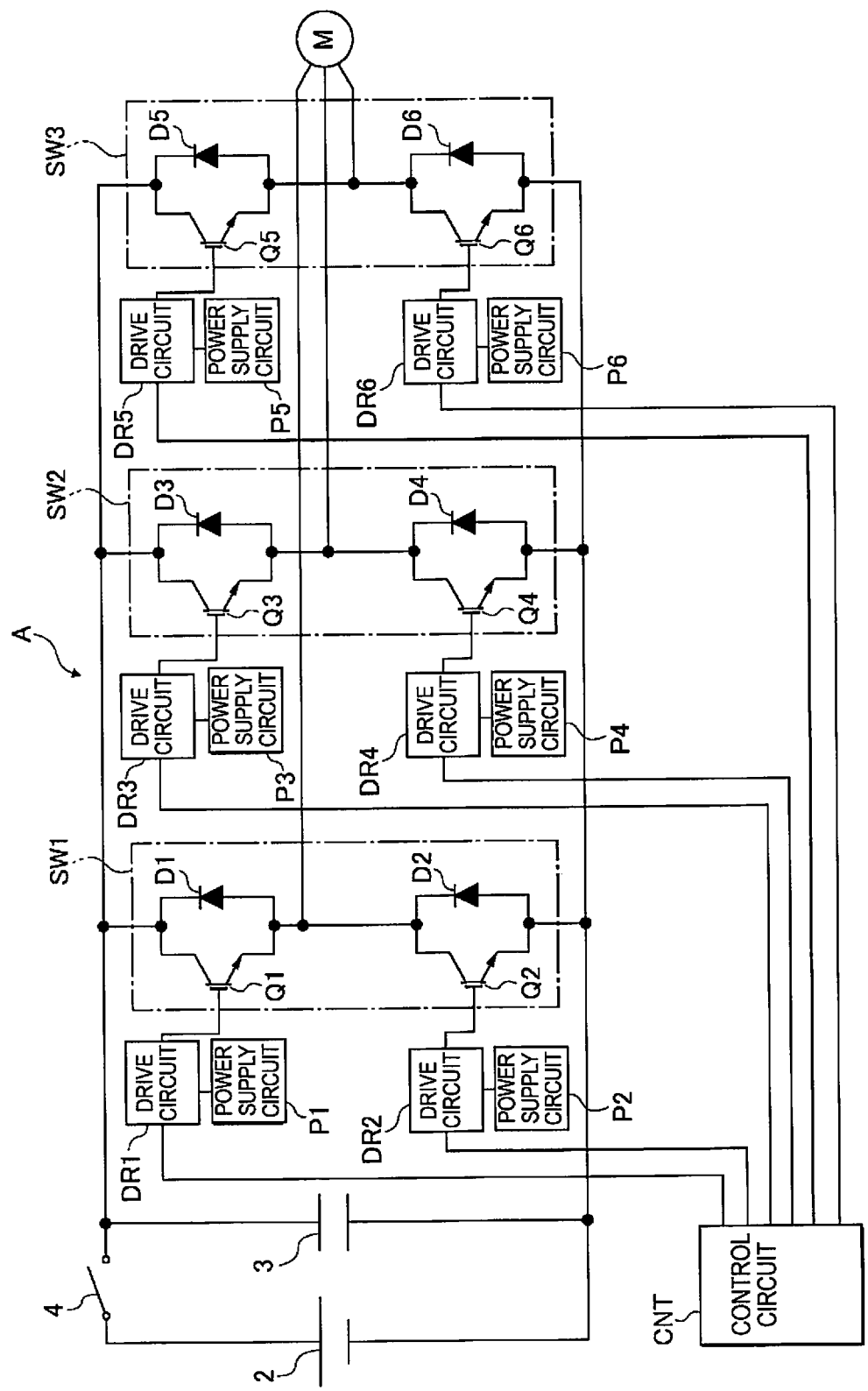
FIG. 1 is a circuit diagram illustrating the circuit configuration of the power conversion device according to the first embodiment.

Preferred embodiments for realizing the power conversion device of the present invention are described below based on the embodiments illustrated in the drawings.

First Embodiment

First, the configuration of the power conversion device of the first embodiment will be described. FIG. 1 is a circuit diagram illustrating the circuit configuration of the power conversion device A of the first embodiment; this power conversion device A converts DC power that is supplied from a DC power source 2 into three-phase AC power and supplies the power to a rotating electrical machine M in order to control the driving of the rotating electrical machine M.

This power conversion device A comprises switching units SW1, SW2, SW3 as switching means for each of the phases of U-phase, V-phase and W-phase. Each of these well-known switching units SW1, SW2, SW3 comprises upper arm switching elements Q1, Q3, Q5 and lower arm switching elements Q2, Q4, Q6. Then, rectifier cells D1-D6 are respectively provided to switching elements Q1-Q6 in parallel. In addition, the DC power source 2 and a smoothing capacitor 3 as a power storage means are connected to each of the switching elements Q1-Q6 in parallel. Furthermore, a relay switch 4 for controlling the voltage value by a switching activation is provided between the DC power source 2 and the smoothing capacitor 3.

Voltages that are output to each phase of the rotary electric machine M are generated by these switching units SW1, SW2, SW3, and further, necessary voltage is supplied to the rotating electrical machine M by selectively connecting these voltages and varying the proportion of the connection times thereof.

Drive circuits DR1-DR6 for driving the switching elements Q1-Q6 are respectively connected to the switching elements Q1-Q6. In addition, power supply circuits P1-P6 for supplying power are respectively connected to the drive circuits DR1-DR6. Then, a control circuit CNT that sends control signals for driving these drive circuits DR1-DR6 is connected to the drive circuits DR1-DR6.

While the control circuit CNT is a so-called low current system circuit, the drive circuits DR1-DR6 and the power supply circuits P1-P6 are high current system circuits that output high-potential electric power that is generated by the power supply transformers T1-T6, described below, to the rotating electrical machine M.

Figure 2:
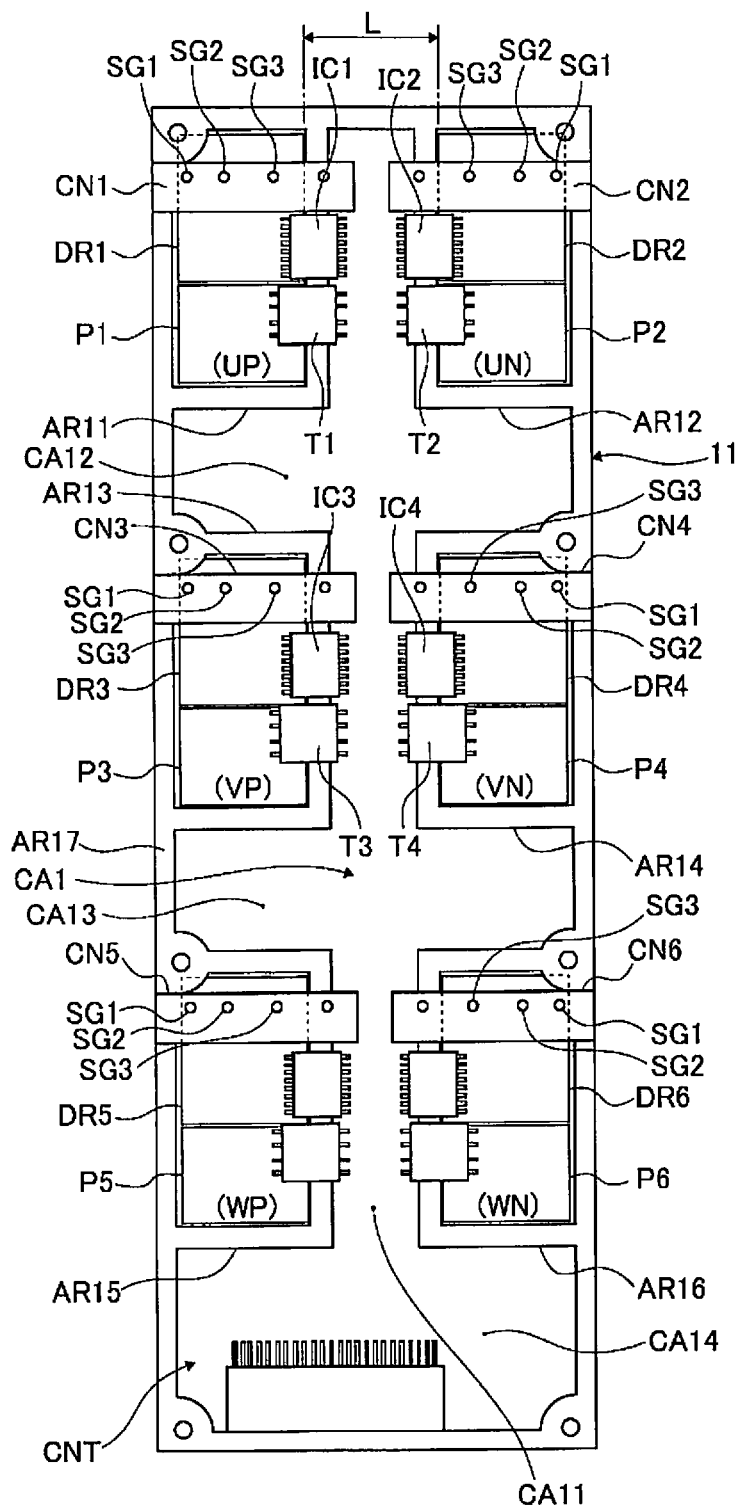
FIG. 2 is a plan view illustrating a substrate on which are mounted the drive circuits, power supply circuits, and control circuits in the power conversion device of the first embodiment.
Figure 3:
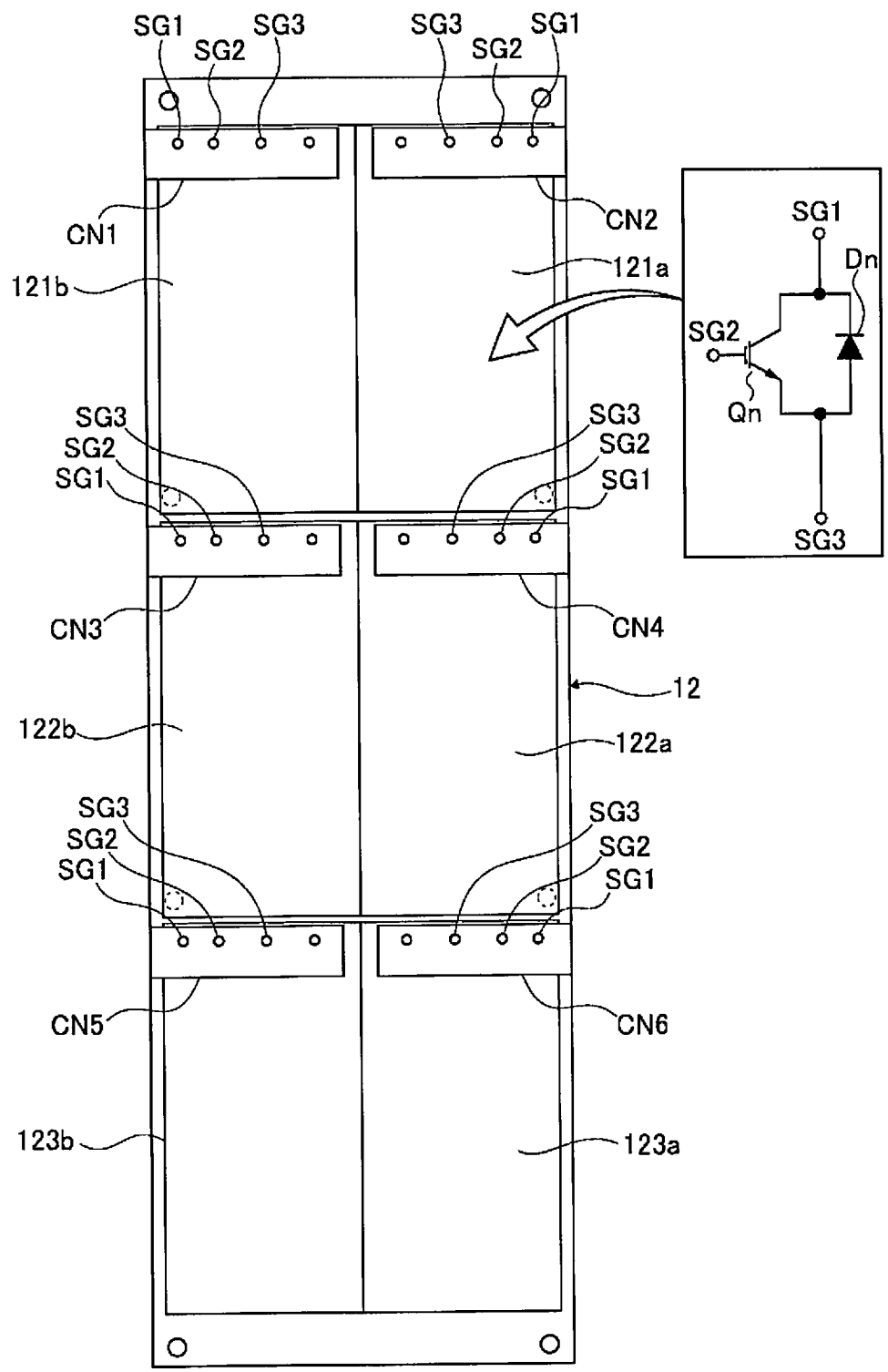
FIG. 3 is a bottom surface view illustrating a power module equipped with a switch unit in the power conversion device of the first embodiment.

The power conversion device A illustrated in FIG. 1 is mounted on the substrate 11 illustrated in FIG. 2 and the power module 12 illustrated in FIG. 3. The substrate 11 illustrated in FIG. 2 is a printed-circuit board, and each of the drive circuits DR1-DR6, power supply circuits P1-P6, and control circuit CNT is mounted thereon. Respective switching elements Q1-Q6 that configure the respective switching units SW1, SW2, SW3 (refer to FIG. 2) are mounted on the power module 12 illustrated in FIG. 3. Then, the drive circuits DR1-DR6 of the substrate 11 and each of the switching elements Q1-Q6 of the switching units SW1, SW2, SW3 of the power module 12 are connected via connection parts CN1-CN6, illustrated in FIG. 2 and FIG. 3.

That is, the power module 12 is provided with respectively pairs of switching element mounting regions 121*a*, 121*b*, switching element mounting regions 122*a*, 122*b*, and switching element mounting regions 123*a*, 123*b*.

Switching elements Q1, Q2 (refer to FIG. 1) that configure the U-phase switching unit SW1, and commutators D1, D2 (refer to FIG. 1) are mounted in the switching element mounting regions 121*a*, 121*b*. Switching elements Q3, Q4 (refer to FIG. 1) that configure the V-phase switching unit SW2, and commutators D3, D4 (refer to FIG. 1) are mounted in the switching element mounting regions 122*a*, 122*b*. Switching elements Q5, Q6 (refer to FIG. 1) that configure the W-phase switching unit SW3, and commutators D5, D6 (refer to FIG. 1) are mounted in the switching element mounting regions 123*a*, 123*b*. That is, pairs of the switching elements Qn and the commutators Dn are mounted on each of the switching element mounting regions 121*a*, 121*b*, 122*a*, 122*b*, 123*a*, 123*b*, as illustrated in FIG. 3. In addition, the terminals illustrated in SG1-SG3 of the commutators Dn and the switching elements Qn illustrated in FIG. 3 are connected to the connection terminals SG1-SG3 of each of the connection parts CN1-CN6.

Next, the substrate 11 illustrated in FIG. 2 will be described. The substrate 11 is made by providing an electrical circuit to a known plate material, primarily made of an insulating resin, and is provided with upper arm side drive-circuit/power supply-circuit arrangement and wiring regions UP, VP, WP and lower arm side drive-circuit/power supply-circuit arrangement and wiring regions UN, VN, WN.

A first drive circuit DR1, power supply circuit P1, and the wiring thereof are mounted in the first drive-circuit/power supply-circuit region UP. A second drive circuit DR2, power supply circuit P2, and the wiring thereof are mounted in the second drive-circuit/power supply-circuit region UN. A third drive circuit DR3, power supply circuit P3, and the wiring thereof are mounted in the third drive-circuit/power supply-circuit region VP. A fourth drive circuit DR4, power supply circuit P4, and the wiring thereof are mounted in the fourth drive-circuit/power supply-circuit region VN. A fifth drive circuit DR5, power supply circuit P5, and the wiring thereof are mounted in the fifth drive-circuit/power supply-circuit region WP. A sixth drive circuit DR6, power supply circuit P6, and the wiring thereof are mounted in the sixth drive-circuit/power supply-circuit region WN.

Then, the respective drive circuits DR1-DR6 of the drive-circuit/power supply-circuit arrangement and wiring regions UP, UN, VP, VN, WP, WN are connected to respective switching elements Q1-Q6 and rectifying elements D1-D6 via respective connection terminals SG1-SG3 of the respective connection parts CN1-CN6. The same connection parts CN1-CN6 illustrated in FIG. 2 and FIG. 3 are illustrated in each drawing, and the substrate 11 and the power module 12 are disposed overlapping vertically in a position where the illustrated connection parts CN1-CN6 are respectively matched.

The outer perimeters of the drive-circuit/power supply-circuit arrangement and wiring regions UP, UN, VP, VN, WP, WN are respectively surrounded by isolating regions AR11-AR16 that are isolated from the control circuit arrangement and wiring region CA1 of a low current system on the control circuit CNT side, as illustrated in FIG. 2. The isolating regions AR11-AR16 are regions to which no electrical configurations are provided, and a necessary isolation distance is formed between the control circuit arrangement and wiring region CA1, described below, which has the control circuit CNT and the wiring thereof.

The control circuit arrangement and wiring region CA1 is a region in which the control circuit CNT and the wiring thereof are arranged in distributed fashion. The wiring above refers to wiring that connects the control circuit CNT with the drive circuits DR1-DR6 as well as with the power supply circuits P1-P6.

The control circuit arrangement and wiring region CA1 is disposed in a region on the substrate 11 surrounded by the isolating regions AR11-AR16 that surround the drive-circuit/power supply-circuit arrangement and wiring regions UP, UN, VP, VN, WP, WN, and the isolating region AR17 that surrounds the outer perimeter of the substrate 11. That is, the control circuit arrangement and wiring region CA1 is provided with a longitudinal wiring region CA11 that cuts across the substrate 11 longitudinally, and transverse wiring regions CA12, CA13, CA14 that cut across this longitudinal wiring region CA11 transversely.

The longitudinal wiring region CA11 is provided between the upper arm side isolating regions AR11, AR13, AR15 and the lower arm side isolating regions AR12, AR14, AR16 in-between the entire length of the substrate 11 in the longitudinal direction. Therefore, pairs of the upper arm side drive-circuit/power supply-circuit arrangement and wiring regions UP, VP, WP and lower arm side drive-circuit/power supply-circuit arrangement and wiring regions UN, VN, WN are separated in the width direction by a gap L, by this longitudinal wiring region CA11 and the isolating regions AR11-AR16. This gap L, described below, is a dimension by which pairs of, in-phase drive circuits DR1 and DR2, DR3 and DR4, and DR5 and DR6, are not mutually subject to greater than or equal to a predetermined amount of the effects of switching noise.

The transverse wiring region CA12 is provided between isolating regions AR11, AR12 that surround the U-phase drive-circuit/power supply-circuit arrangement and wiring regions UP, UN, and isolating regions AR13, AR14 that surround the V-phase drive-circuit/power supply-circuit arrangement and wiring regions VP, VN in-between the entire width of the substrate 11 in the width direction (lateral direction in FIG. 2). The transverse wiring region CA13 is provided between isolating regions AR13, AR14 that surround the V-phase drive-circuit/power supply-circuit arrangement and wiring regions VP, VN, and isolating regions AR15, AR16 that surround the W-phase drive-circuit/power supply-circuit arrangement and wiring regions WP, WN in-between the entire width of the substrate 11 in the width direction (lateral direction in FIG. 2). The transverse wiring region CA14 is provided between isolating regions AR15, AR16 that surround the W-phase drive-circuit/power supply-circuit arrangement and wiring regions WP, WN, and the isolating region AR17 on the outer perimeter of the substrate 11 across the entire width of the substrate 11 in the width direction (lateral direction in FIG. 2).

Power supply transformers T1-T6 and switch circuits IC1-IC6 are respectively provided to the drive-circuit/power supply-circuit arrangement and wiring regions UP, UN, VP, VN, WP, WN across the isolating regions AR11-AR16.

The power supply transformers T1-T6 boost the supplied voltage of a low current system supplied from the control circuit CNT to a driving voltage of a high current system, and supplies same to the power supply circuits P1-P6. Then, this high current system driving voltage is supplied to the respective switching units SW1-SW3 via drive circuits DR1-DR6. In addition, the switch circuits IC1-IC6 convert switching control signals of a low current system from the control circuit CNT to switching signals of a high current system that drive the respective drive circuits DR1-DR6.

Figure 4A:
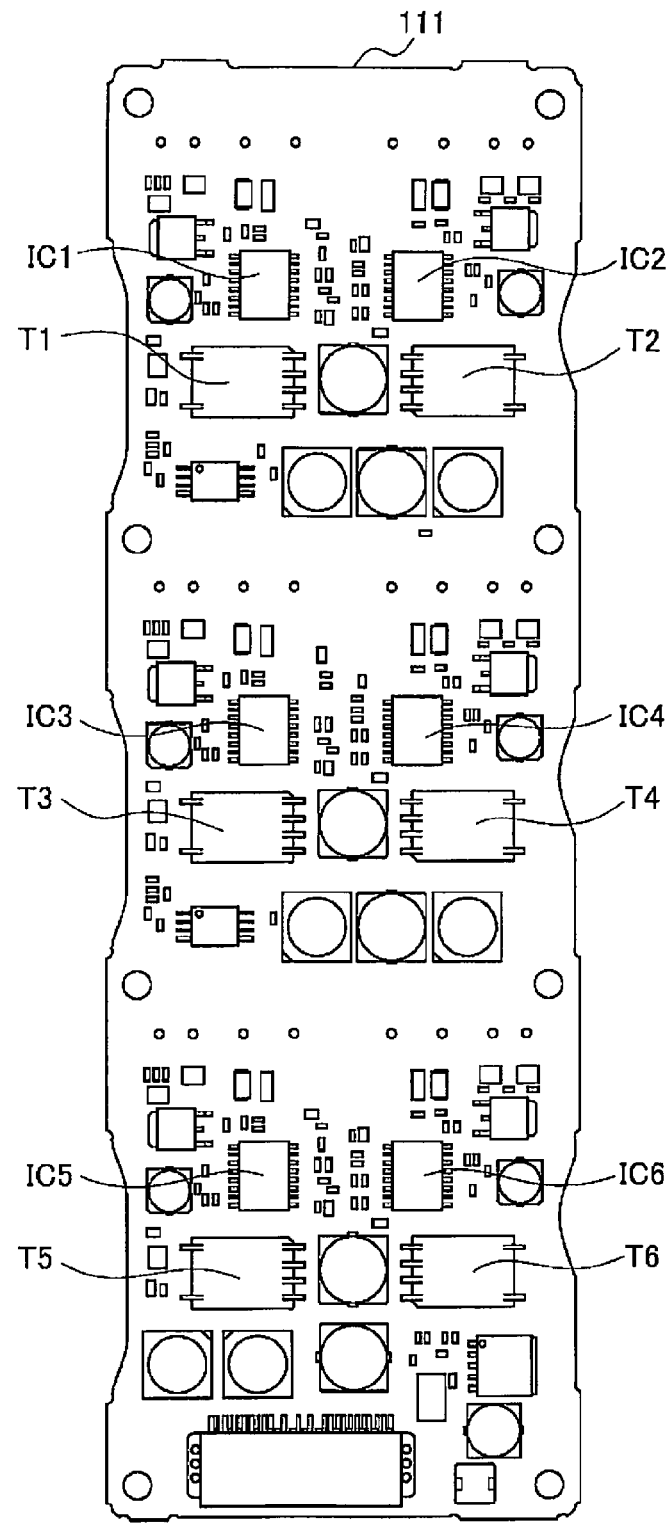
FIG. 4A is a plan view illustrating the arrangement of the power supply transformer, etc., in the L1 layer of a multilayer structured substrate used in the power conversion device of the first embodiment.

Next will be added a description of the specific configuration of the above-described circuit configuration of the substrate 11. The substrate 11 is provided with a three-layered wiring structure. This layer structure will be described based on FIG. 4A, FIG. 4B, FIG. 4C, and FIG. 4D. The substrate 11 is provided with an L1 layer 111 illustrated in FIG. 4A and FIG. 4B, an L2 layer 112 illustrated in FIG. 4C, and an L3 layer 113 illustrated in FIG. 4D.

Figure 4B:
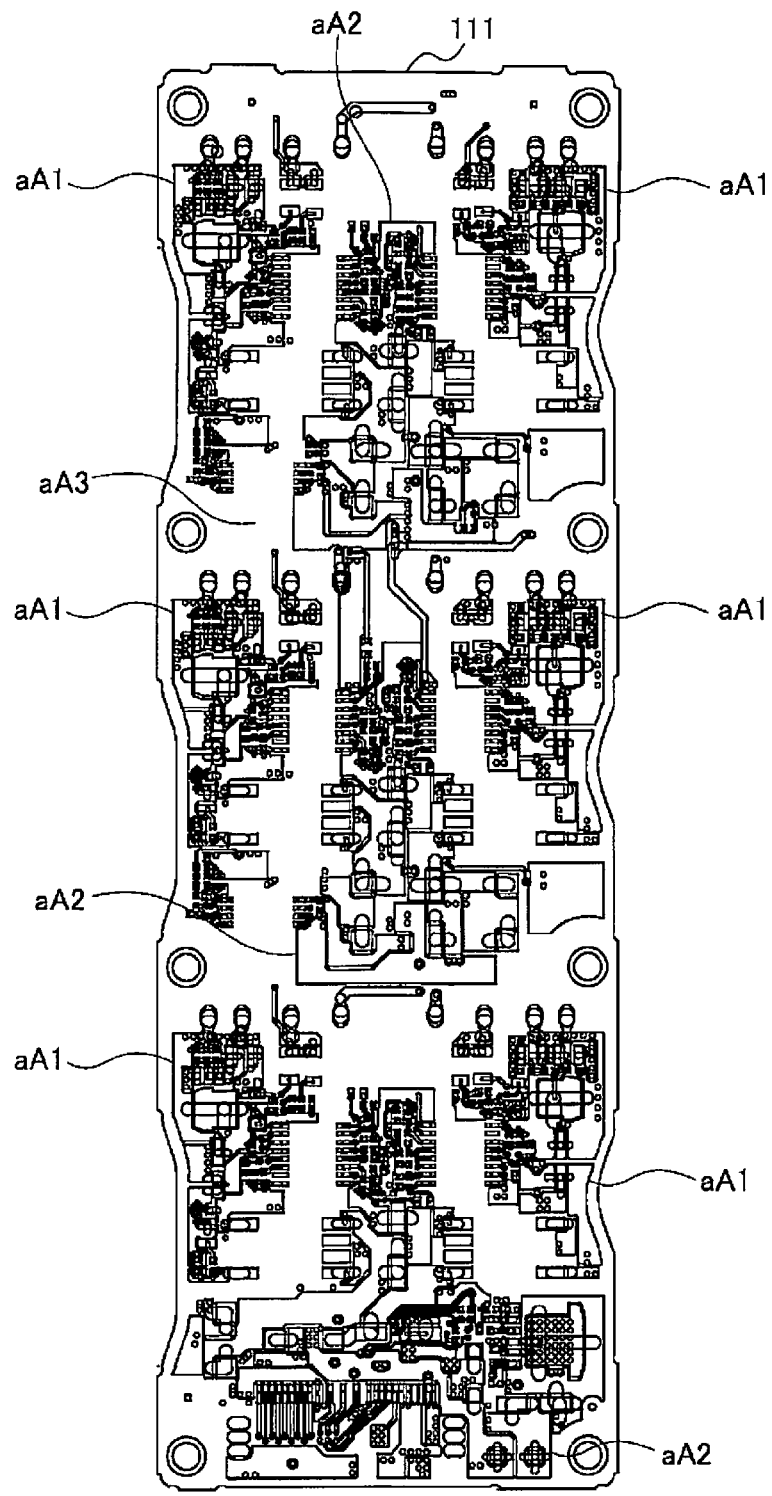
FIG. 4B is a plan view illustrating the arrangement of the drive-circuit/power supply-circuit region, the control circuit arrangement and wiring region, and the isolating region in the L1 layer of the multilayer structured substrate used in the power conversion device of the first embodiment.
Figure 4C:
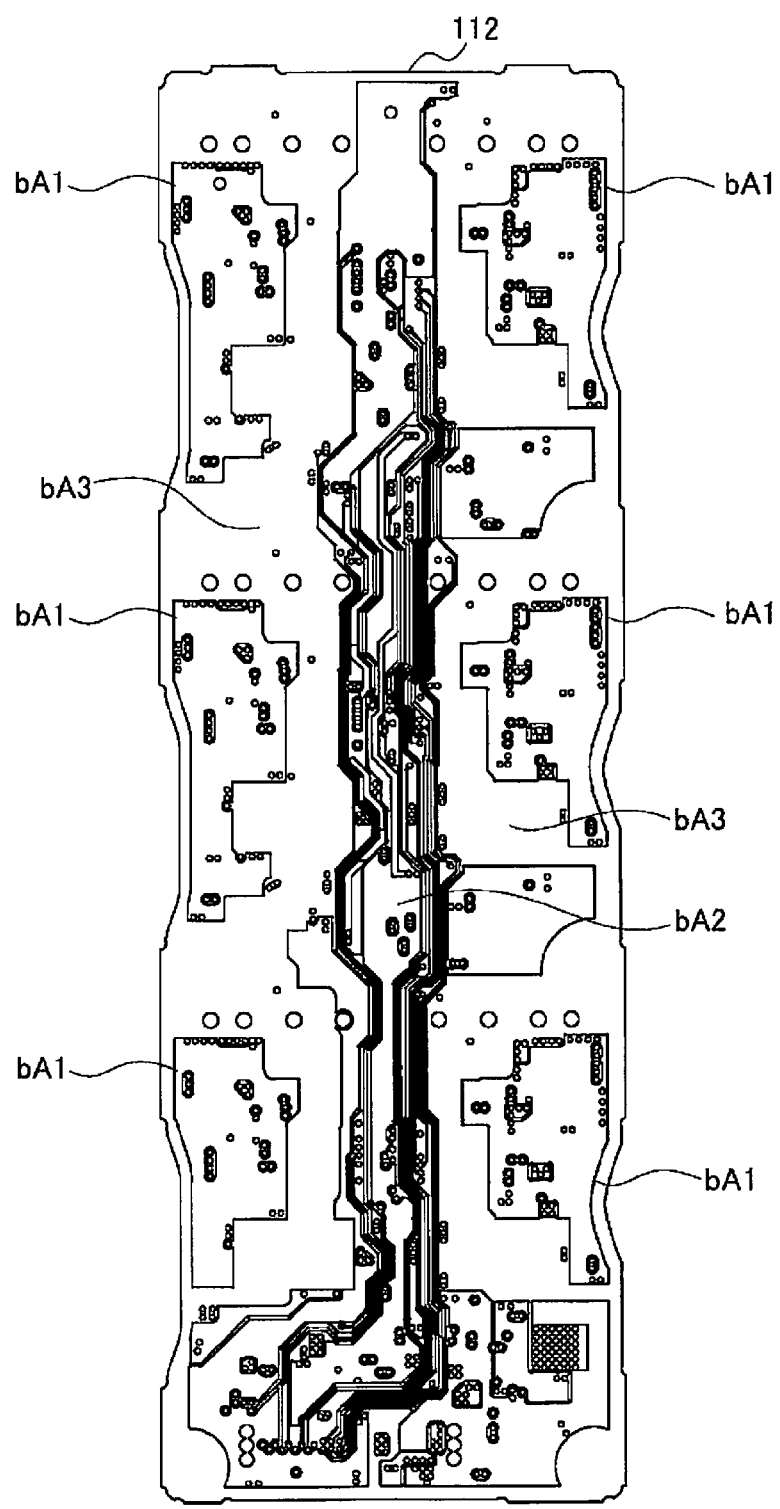
FIG. 4C is a plan view illustrating the arrangement of the drive-circuit/power supply-circuit region, the control circuit arrangement and wiring region, and the isolating region in the L2 layer of the multilayer structured substrate used in the power conversion device of the first embodiment.
Figure 4D:
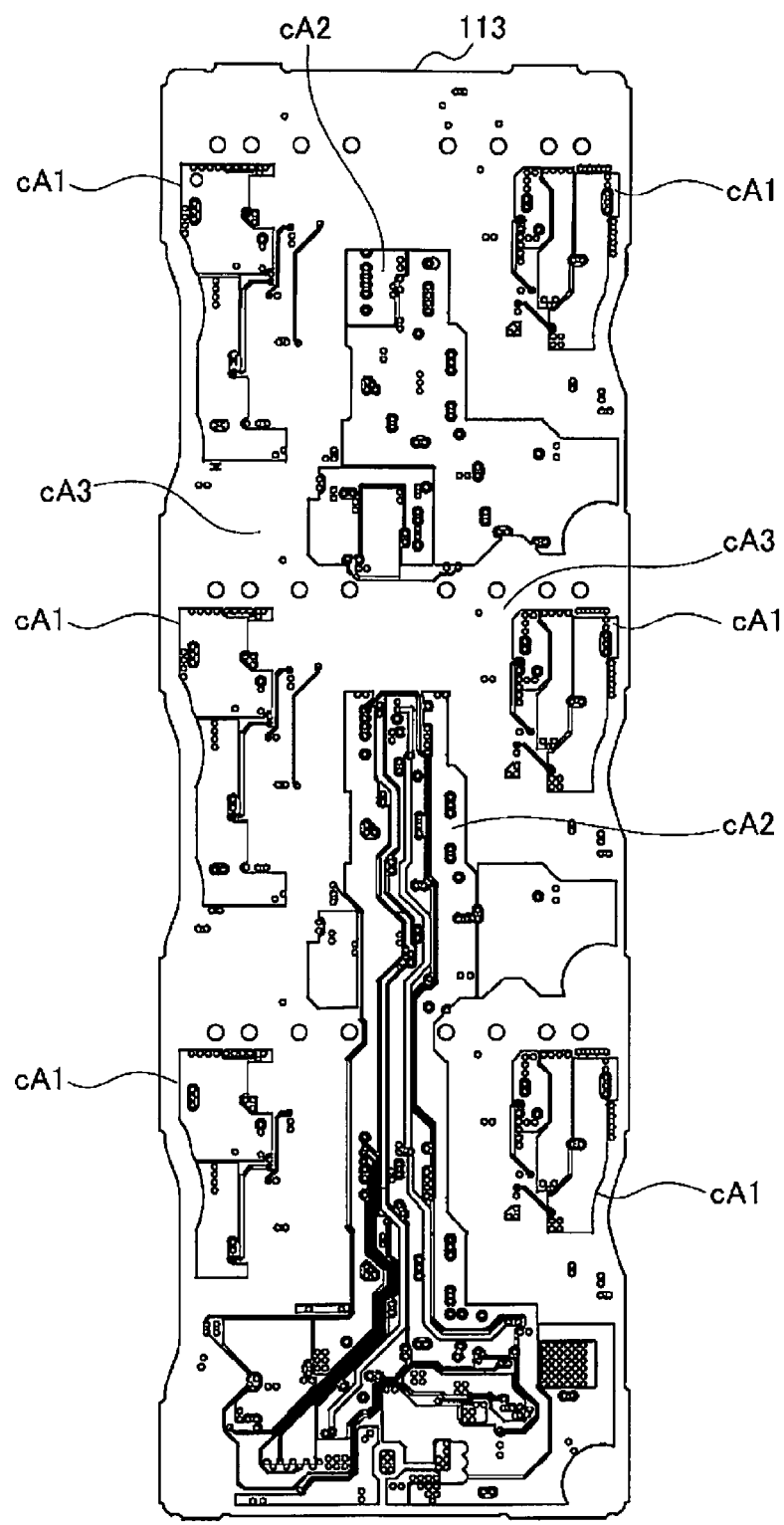
FIG. 4D is a plan view illustrating the arrangement of the drive-circuit/power supply-circuit region, the control circuit arrangement and wiring region, and the isolating region in the L3 layer of the multilayer structured substrate used in the power conversion device of the first embodiment.

The L1 layer 111 is provided with a high current wiring portions aA1 disposed in the drive-circuit/power supply-circuit arrangement and wiring regions UP, UN, VP, VN, WP, WN (refer to FIG. 2), and low current wiring portions aA2 disposed in the control circuit arrangement and wiring region CA1 (refer to FIG. 2), as illustrated in FIG. 4B. Then, a section aA3 that configures the above-described isolating regions AR11-AR16 is set between the high current wiring portion aA1 and the low current wiring portion aA2.

In addition, respective ones of the power supply transformers T1-T6 and the switch circuits IC1-IC6 are mounted on the L1 layer 111 across the section aA3, connected to the high current wiring portion aA1 and the low current wiring portion aA2, as illustrated in FIG. 4A. In addition, electronic components that configure a part of the control circuit CNT are mounted on the L1 layer 111, connected to the low current wiring portion aA2 at a position that overlaps with the low current wiring portion aA2, as illustrated. Additionally, electronic components that configure the drive circuits DR1-DR6 and the power supply circuits P1-P6 are mounted on the L1 layer 111, connected to the high current wiring portion aA1 at a position that overlaps with the high current wiring portion aA1.

The L2 layer 112 is provided with a high current wiring portions bA1 disposed in the drive-circuit/power supply-circuit arrangement and wiring regions UP, UN, VP, VN, WP, WN (refer to FIG. 2), and low current wiring portions bA2 disposed in the control circuit arrangement and wiring region CA1 (refer to FIG. 2). Then, a section bA3 that configures the isolating regions AR11-AR16 is set between the high current wiring portion bA1 and the low current wiring portion bA2.

Similarly, the L3 layer 113 is provided with a high current wiring portions cA1 disposed in the drive-circuit/power supply-circuit arrangement and wiring regions UP, UN, VP, VN, WP, WN (refer to FIG. 2) and low current wiring portions cA2 disposed in the control circuit arrangement and wiring region CA1 (refer to FIG. 2). Then, a section cA3 that configures the isolating regions AR11-AR16 is set between the high current wiring portion cA1 and the low current wiring portion cA2.

Effects of the First Embodiment

Next, the effect of the first embodiment will be described. When the drive circuits DR1-DR6 carry out switch-driving, switching noise is induced. In particular, in drive circuits that are in-phase on the upper arm side and the lower arm side, for example, the drive circuit DR1 and the drive circuit DR2 in the U-phase, if the distance between the two is short, this switching noise will be increased. Consequently, if the distance between the upper arm side and lower arm side drive circuits cannot secure a sufficient gap between the two, being constrained by the width of the power supply transformer, switching noise that is induced by the switch-driving of the two drive circuits would affect each other, as was the case in Patent Document 1.

In contrast, in the present first embodiment, power supply transformers T1-T6 are respectively provided to the drive circuits DR1-DR6. Accordingly, the distance between the upper arm side drive circuits DR1, DR3, DR5 and the lower arm side drive circuits DR2, DR4, DR6 is not restricted by the width of the power supply transformers T1-T6, and it is possible to widely secure a gap L between the two. Accordingly, the gap L between the upper arm side drive circuits DR1, DR3, DR5 and the lower arm side drive circuits DR2, DR4, DR6 is more widely formed than the width dimension, which is constrained by the power supply transformers T1-T6.

Therefore, in the present first embodiment, it is possible to minimize the effect of switching noise that is induced by the switching drive of an arm other than itself, compared to when this gap L is constrained by the power supply transformers T1-T6.

Furthermore, by providing power supply transformers T1-T6 independently to each arm, the distance between the output wiring of the power supply circuits P1-P6 and the respective drive circuits DR1-DR6 can be shortened. It thereby becomes possible to reduce the size of the drive-circuit/power supply-circuit arrangement and wiring regions UP-WN and to miniaturize the substrate 11. In addition, by providing power supply transformers T1-T6 independently to each arm, the flexibility in arranging the drive circuits DR1-DR6 is increased, and it is possible to shorten the power supply wiring from the drive circuits DR1-DR6 to the respective switching elements Q1-Q6. Therefore, it is possible to achieve a reduction in inductance and a reduction in switching noise by shortening the power supply wiring to the respective switching elements Q1-Q6, in addition to shortening the power supply wiring from the power supply circuits P1-P6 to the drive circuits DR1-DR6 described above.

That is, if the positions of the power supply circuits P1-P6 are constrained by the dimension of the power supply transformer while the positions of the drive circuits DR1-DR6 are regulated to the positions of the connection parts CN1-CN6 as in Patent Document 1, the distance between the two becomes farther than that of the first embodiment. In this case, the substrate 11 is increased in size, and the length of the power supply wiring is increased, which increases inductance and switching noise. The present first embodiment is able to suppress such a problem.

In addition, by providing power supply transformers T1-T6 independently to each arm, variation in the degree of coupling of the winding wire is suppressed, and it is possible to achieve an increase in the accuracy of the power output, compared to when a transformer with multiple outputs is used. Furthermore, in addition to the isolating regions AR11-AR16, a longitudinal wiring region CA11 of the control circuit arrangement and wiring region CA1 was interposed in the gap L portion between the upper arm side drive circuits DR1, DR3, DR5 and the lower arm side drive circuits DR2, DR4, DR6. It thereby becomes possible to dispose the control circuit arrangement and wiring region CA1 in distributed fashion across the entire substrate 11, to thereby reduce the size of the substrate 11 compared to those in which the control circuit arrangement and wiring region CA1 is concentrated in one location. That is, if the width of the region corresponding to the longitudinal wiring region CA11 of the first embodiment is restricted by the width of the power supply transformer, as in Patent Document 1, it raises the necessity of increasing the area of the portion corresponding to the transverse wiring region CA14, in order to dispose the control circuit CNT and the wiring thereof. In addition, in this case, since the wiring distances with respect to the drive circuits DR1-DR6 will be increased in the portion corresponding to the transverse wiring region CA14, the required area is also increased. In contrast, in the present first embodiment, an efficient arrangement becomes possible by the decentralization of the control circuit arrangement and wiring region CA1 described above, and it becomes possible to miniaturize the substrate 11.

Furthermore, in the present first embodiment, transverse wiring regions CA12-CA14 of the control circuit arrangement and wiring region CA1 were interposed between each of the upper arm side drive circuits DR1, DR3, DR5. Therefore, it becomes possible further to achieve decentralization of the control circuit arrangement and wiring region CA1 described above, and to reduce further the size of the substrate 11.

Effects of the First Embodiment

The effects of the power conversion device of the first embodiment are listed below.

1) The power conversion device of the first embodiment is a power conversion device comprising: a smoothing capacitor 3 as a power storage means that is connected to a power source 2; a plurality of switching units SW1-SW3 provided with a pair of switching elements Q1-Q6 that are connected to this smoothing capacitor 3 and that converts DC power to AC power by the switching operation of these switching elements Q1-Q6; drive circuits DR1-DR6 that receive control signals from a control circuit CNT that controls the switching operation to drive the switching elements Q1-Q6; and a substrate 11 on which are mounted the control circuit CNT, the drive circuits DR1-DR6, and the power supply circuits P1-P6, wherein the substrate 11 includes drive-circuit/power supply-circuit arrangement and wiring regions UP, UN, VP, VN, WP, WN of a high current system, in which the drive circuits DR1-DR6 and the power supply circuits P1-P6 are disposed, for each of the switching elements Q1-Q6 with isolating regions AR11-AR16 interposed between the control circuit CNT of a low current system, and a predetermined gap L that is formed between the pairs of the drive-circuit/power supply-circuit regions (UP, UN) (VP, VN) (WP, WN) respectively connected to the pairs of the switching elements (Q1, Q2) (Q3, Q4) (Q5, Q6), the power supply transformers T1-T6 are provided across the isolating regions AR11-AR16 for the respective power supply circuits P1-P6 for transforming a voltage supplied from the control circuit CNT to a driving voltage. In this manner, by providing power supply transformers T1-T6 independently to each arm, the flexibility in arranging the drive circuits DR1-DR6 is increased, and the design flexibility is improved. It thereby becomes possible to secure sufficient distance between the upper arm side drive circuits DR1, DR3, DR5 and the lower arm side drive circuits DR2, DR4, DR6, and to minimize the effect of switching noise that is induced by the switching drive of an arm other than itself. Furthermore, by providing power supply transformers T1-T6 independently to each arm, it becomes possible to shorten the distance between the output wiring of the power supply circuits P1-P6 and the respective drive circuits DR1-DR6 to thereby reduce the size of the drive-circuit/power supply-circuit arrangement and wiring regions UP, UN, VP, VN, WP, WN, and to miniaturize the substrate 11. In addition, it becomes possible to reduce the inductance and to reduce the switching noise by the shortening of the wiring distance. In addition, by providing power supply transformers T1-T6 independently to each arm, the variation in the degree of coupling of the winding wire is suppressed, and it is possible to achieve an increase in the accuracy of the power output, compared to when a transformer with multiple outputs is used.

2) The power conversion device of the first embodiment is characterized in that a longitudinal wiring region CA11 of the control circuit arrangement and wiring region CA1, which has the control circuit CNT and the wiring, is disposed in the gap portion that is formed between the pairs of the drive-circuit/power supply-circuit regions (UP, UN) (VP, VN) (WP, WN) in-between the isolating regions AR11-AR16. Therefore, the gap L portion on the substrate 11 that is formed between the pairs of the drive-circuit/power supply-circuit regions (UP, UN) (VP, VN) (WP, WN) can be effectively utilized, and an efficient arrangement becomes possible by achieving decentralization of the control circuit arrangement and wiring region CA1. Therefore, it becomes possible to further miniaturize the substrate 11.

3) The power conversion device of the first embodiment is characterized in that transverse wiring regions CA12, CA13 of the control circuit arrangement and wiring region CA1 are disposed between the pairs of the drive-circuit/ power supply-circuit regions (UP, UN) (VP, VN) (WP, WN) and the other pairs of the drive-circuit/power supply-circuit regions (UP, UN) (VP, VN) (WP, WN) in-between the isolating regions AR11-AR16. Therefore, it is possible to reduce the effects of switching noise between each of the upper arm side drive circuits DR1, DR3, DR5, as well as between each of the lower arm side drive circuits DR2, DR4, DR6, that is, the switching noise of an arm other than itself. Additionally, by providing a longitudinal wiring region CA11 and transverse wiring regions CA12-CA14, decentralization of the control circuit arrangement and wiring region CA1 on the substrate 11 is achieved, making further miniaturization of the substrate 11 possible. In particular, if the transverse wiring regions CA12, CA13 and the longitudinal wiring region CA11 of 2) above are disposed side by side, a further decentralization of the control circuit CNT is achieved, and further miniaturization of the substrate 11 becomes possible.

4) The power conversion device of the first embodiment is characterized in that connection parts CN1-CN6 that connect with the switching elements Q1-Q6 are provided for the respective drive-circuit/power supply-circuit arrangement and wiring regions UP, UN, VP, VN, WP, WN. Therefore, it becomes possible to shorten the power supply wiring from the drive circuits DR1-DR6 to the respective switching elements Q1-Q6, and to thereby achieve a reduction in inductance and a reduction in switching noise.

5) The power conversion device of the first embodiment is characterized in that the gap L between the pairs of the drive-circuit/power supply-circuit regions (UP, UN) (VP, VN) (WP, WN) is formed to have a larger dimension than the gap (width of the power supply transformer) when driving the pairs of the drive-circuit/power supply-circuit regions (UP, UN) (VP, VN) (WP, WN) with one power supply transformer. It thereby becomes possible to secure sufficient distance between the upper arm side drive circuits DR1, DR3, DR5 and the lower arm side drive circuits DR2, DR4, DR6, and to minimize the effect of switching noise that is induced by the switching drive of an arm other than itself.

Other Embodiments

Next, the power conversion device according to other embodiments will be described. Since the other embodiments are modified examples of the first embodiment, configurations common to the first embodiment are given the same reference symbols as the first embodiment and the descriptions thereof are omitted, while describing only the differences from the first embodiment.

Second Embodiment 2

Figure 5:
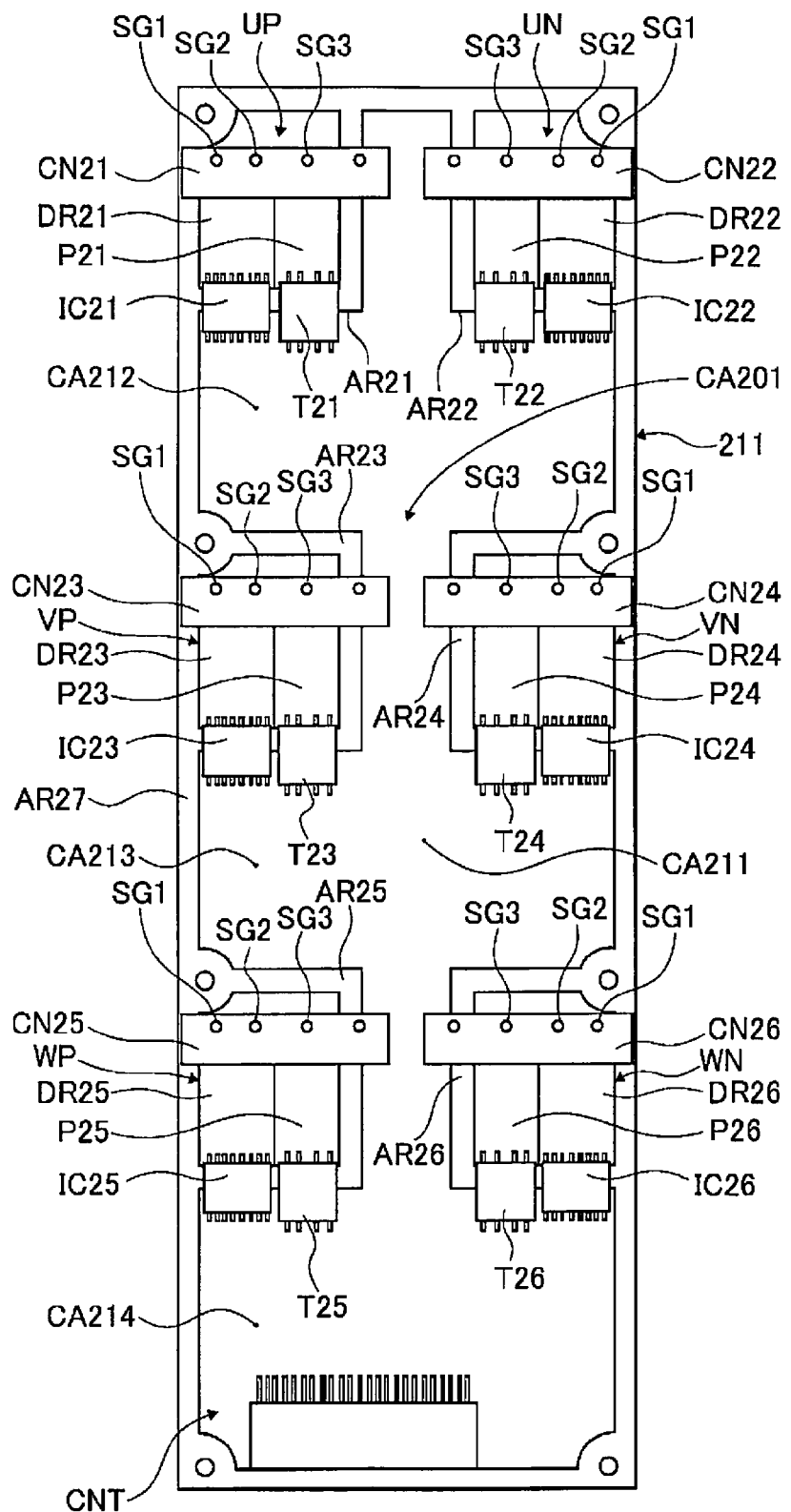
FIG. 5 is a plan view illustrating a substrate on which are mounted the drive circuits, power supply circuits, and control circuits in the power conversion device of the second embodiment.

The power conversion device of the second embodiment illustrates an example in which the arrangements of the switch circuits IC1-IC6 as well as the power supply transformers T1-T6 are changed, and the shapes of the drive-circuit/power supply-circuit arrangement and wiring regions UP, UN, VP, VN, WP, WN are varied, as illustrated in FIG. 5.

That is, compared with the first embodiment, the lateral dimensions of the drive-circuit/power supply-circuit arrangement and wiring regions UP, UN, VP, VN, WP, WN in FIG. 5 are formed relatively large, and the vertical dimensions are formed relatively small. Moreover, in addition to the foregoing, the width dimension of the longitudinal wiring region CA211 in the control circuit arrangement and wiring region CA201 in the lateral direction of FIG. 5 is narrowed, while the width dimensions of the transverse wiring regions CA212-CA214 in the vertical direction of FIG. 5 are widened. The drive-circuit/power supply-circuit arrangement and wiring regions UP, UN, VP, VN, WP, WN are respectively provided with drive circuits DR21-DR26 and power supply circuits P21-P26, in the same manner as in the first embodiment. Then, the drive circuits DR21-DR26 are arranged on the outer side and the power supply circuits P21-P26 are arranged on the inner side in the width direction of the substrate 11 (lateral direction of FIG. 5), and the gap between in-phase drive circuits DR21-DR26 is widely formed.

In addition, the switch units IC21-IC26 and power supply transformers T21-T26 are connected to the transverse wiring regions CA212-CA214 and the respective drive-circuit/ power supply-circuit arrangement and wiring regions UP, UN, VP, VN, WP, WN in-between the respective isolating regions AR21-AR26. An isolating region AR27 is provided on the outer perimeter of the substrate 211.

In this second embodiment, as stated in 2) of the effects of the first embodiment, by providing power supply transformers T21-T26 independently for the respective power supply circuits P21-P26, the flexibility in arranging the drive circuits DR21-DR26 is increased. The flexibility in arranging the switch circuits IC21-IC26 and the power supply transformers T21-T26 is increased, and it becomes possible to have an arrangement as in the second embodiment, if necessary. In addition, the second embodiment also exerts the effects 1)-5) described in the first embodiment.

Third Embodiment

Figure 6:
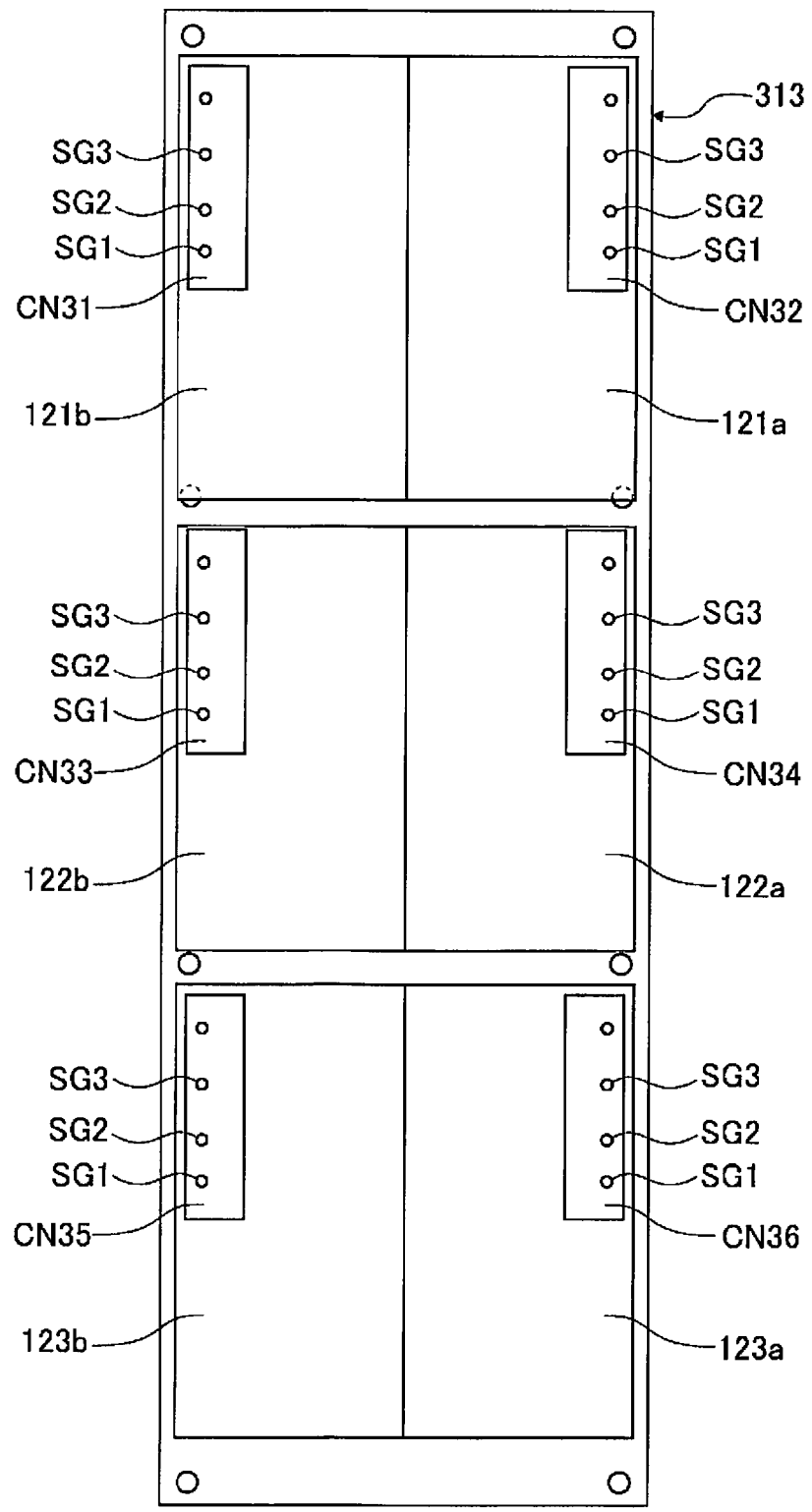
FIG. 6 is a bottom surface view illustrating a power module equipped with a switch unit in the power conversion device of the third embodiment.
Figure 7:
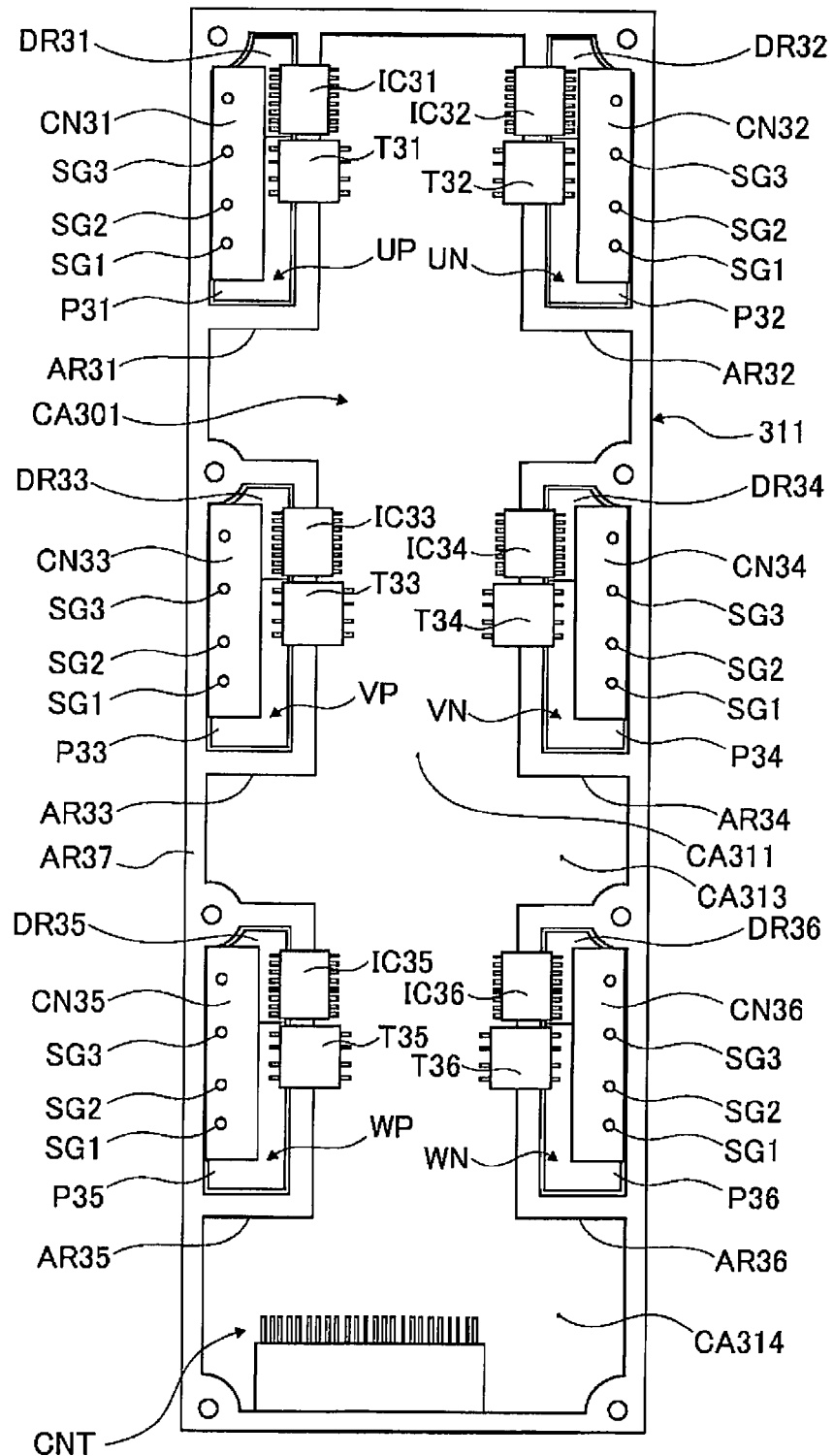
FIG. 7 is a plan view illustrating a substrate on which are mounted the drive circuits, power supply circuits, and control circuits in the power conversion device of the third embodiment.

The power conversion device of the third embodiment is an example in which the arrangement of the connection parts CN31-CN36 of the power module 313 is varied from the first embodiment, as illustrated in FIG. 6. Here, accompanying the above, the shapes of the drive-circuit/power supply-circuit arrangement and wiring regions UP, UN, VP, VN, WP, WN as well as the arrangement of the connection parts CN31-CN36, are varied from the first and second embodiments as well, as illustrated in FIG. 7.

That is, in the power module 313 illustrated in FIG. 6, the connection parts CN31-CN36 are arranged on the outer side upper corners of the switching element mounting regions 121a, 121b, 122a, 122b, 123a, 123b.

Then, the drive-circuit/power supply-circuit arrangement and wiring regions UP, UN, VP, VN, WP, WN are arranged vertically in the drawing so as to surround the connection parts CN31-CN36, and the outer perimeter thereof is surrounded by the isolating regions AR31-AR36. Additionally, the outer perimeter of the substrate 311 is surrounded by the isolating region AR37.

In the drive-circuit/power supply-circuit arrangement and wiring regions UP, UN, VP, VN, WP, WN, the drive circuits DR31-DR36 and power supply circuits P31-P36 are disposed side by side in the vertical direction of the drawing, in the same manner as in the first embodiment.

Furthermore, the switch units IC31-IC36 and power supply transformers T31-T36 are connected to the longitudinal wiring region CA311 and the respective drive-circuit/power supply-circuit arrangement and wiring regions UP, UN, VP, VN, WP, WN in-between the respective isolating regions AR31-AR36, in the same manner as in the first embodiment. Additionally, in the third embodiment, by forming the drive-circuit/power supply-circuit arrangement and wiring regions UP, UN, VP, VN, WP, WN to have narrow widths, the width dimension of the longitudinal wiring region CA311 is formed even wider than the first embodiment. That is, the gap between the in-phase drive-circuit/power supply-circuit arrangement and wiring regions UP, VP, WP and drive-circuit/power supply-circuit arrangement and wiring regions UN, VN, WN is formed even wider.

As described above, as stated in 2) of the effects of the first embodiment, by providing power supply transformers T31-T36 independently for the respective power supply circuits P31-P36, the flexibility in arranging the drive circuits DR31-DR36 is increased in the third embodiment as well. The respective drive-circuit/power supply-circuit arrangement and wiring regions UP, UN, VP, VN, WP, WN can thereby be arranged in accordance with the arrangement of the connection parts CN1-CN6 of the power module 312. In addition, by widening the width of the longitudinal wiring region CA311 to make the gap between the in-phase drive-circuit/power supply-circuit arrangement and wiring regions UP, VP, WP and drive-circuit/power supply-circuit arrangement and wiring regions UN, VN, WN even wider, it is possible further to reduce the effects of switching noise. The third embodiment also exerts the effects 1)-5) described in the first embodiment.

The embodiments of the power conversion device of the present invention were described above, but specific configurations thereof are not limited to these embodiments, and various modifications and additions to the design can be made without departing from the scope of the invention according to each claim in the Claims. For example, the shape of each drive-circuit/power supply-circuit arrangement and wiring region is not limited to the shape illustrated in the embodiments and may be formed in any shape according to the shape and the arrangement of each switch unit arranging region of the power module. Additionally, a three-phase power conversion device was given as an example in the embodiment, but the number of phases is not limited to three phases.

The invention claimed is:

1. A power conversion device comprising:
    a power storage device that is configured to be connected to a DC power source;
    a plurality of switching units provided with a pair of switching elements that are connected to the power storage device and that converts DC power to AC power by a switching operation of these switching elements;
    a plurality of drive circuits that receive control signals from a control circuit that controls the switching operation to drive the switching elements;
    a plurality of power supply circuits that supply power to the drive circuits; and
    a substrate on which are mounted the control circuit, the drive circuits and the power supply circuits,
    the substrate including drive-circuit/power supply-circuit regions of a high current system, in which the drive circuits and the power supply circuits are disposed, for each of the switching elements with isolating regions interposed between the control circuit of a low current system and the drive-circuit/power supply-circuit regions, and a predetermined gap formed between respective lateral pairs of the drive-circuit/power supply-circuit regions connected to pair of the switching elements, and power supply transformers provided across the isolating regions of the power supply circuits, respectively, for transforming a voltage supplied from the control circuit to a driving voltage,
    the substrate including a first control circuit arrangement and wiring region, that has the control circuit and wiring thereof, and that is disposed in the predetermined gap formed between the lateral pairs of the drive-circuit/power supply-circuit regions and in-between the isolating regions, and
    the substrate including a second control circuit arrangement and wiring region, which has the control circuit and wiring thereof, and that is disposed in between the lateral pairs of the drive-circuit/power supply-circuit regions and longitudinal pairs of the drive-circuit/power supply-circuit regions and in-between the isolating regions.

2. The power conversion device according to claim 1, further comprising
    a power module comprising the switching elements, the power module being provided in parallel with the substrate, and
    a plurality of connection parts that connect with the switching elements of the power module, the connection parts being provided for the drive-circuit/power supply-circuit regions, respectively.

* * * * *